(12) United States Patent
Ngo et al.

(10) Patent No.: US 6,377,549 B1
(45) Date of Patent: Apr. 23, 2002

(54) CALL ADMISSION CONTROL SYSTEM FOR WIRELESS ATM NETWORKS

(75) Inventors: Chiu Y. Ngo, Ossining, NY (US); Andreas Hettich, Aachen (DE)

(73) Assignee: U.S. Philips Corporation, New York, NY (US)

(*) Notice: Subject to any disclaimer, the term of this patent is extended or adjusted under 35 U.S.C. 154(b) by 0 days.

(21) Appl. No.: 09/107,526

(22) Filed: Jun. 30, 1998

(51) Int. Cl.[7] .......................... H04L 12/26; H04Q 7/00
(52) U.S. Cl. .................. 370/233; 370/328; 370/395.21
(58) Field of Search ................. 370/229–236, 370/468, 411–419, 397, 360, 477, 328, 338; 709/223–229, 232–233; 710/29, 36, 42, 56; 455/450–452, 509

(56) References Cited

U.S. PATENT DOCUMENTS

| | | | |
|---|---|---|---|
| 5,280,483 A | | 1/1994 | Kamoi et al. ............... 370/94.1 |
| 5,583,857 A | | 12/1996 | Soumiya et al. ............ 370/233 |
| 5,623,495 A | * | 4/1997 | Eng et al. .................. 370/397 |
| 5,838,663 A | * | 11/1998 | Elwalid et al. ............. 370/233 |
| 5,982,750 A | * | 11/1999 | Tabe et al. .................. 370/233 |
| 6,021,116 A | * | 2/2000 | Chiussi et al. .............. 370/236 |
| 6,028,840 A | * | 2/2000 | Worster ...................... 370/230 |
| 6,046,981 A | * | 4/2000 | Ramamurthy et al. ...... 370/232 |
| 6,137,793 A | * | 10/2000 | Gorman ...................... 370/360 |
| 6,215,768 B1 | * | 4/2001 | Kim ........................... 370/230 |
| 6,222,823 B1 | * | 4/2001 | Smith et al. ................ 370/230 |
| 6,240,066 B1 | * | 5/2001 | Nagarajan et al. .......... 370/230 |

FOREIGN PATENT DOCUMENTS

WO   WO9524812   9/1995

OTHER PUBLICATIONS

PHA 23,206, U.S. Ser. No. 08/770,024, filed: Dec. 19, 1996.

* cited by examiner

*Primary Examiner*—Huy D. Vu
*Assistant Examiner*—Steven Nguyen
(74) *Attorney, Agent, or Firm*—Daniel J. Piotrowski (57) ABSTRACT

A system which determines whether to accept a wireless connection to a network device receives a request to initiate the wireless connection to the network device, and then determines, in response to the request, a nominal cell rate at which cells are exiting from a buffer in the network device for the requested wireless connection. Thereafter, the system determines an amount of buffer space in the network device required to accommodate the connection, and decides whether to accept the wireless connection based on the nominal cell rate and the amount of buffer space required to accommodate the connection.

19 Claims, 7 Drawing Sheets

| ATTRIBUTE | ATM TRAFFIC TYPES | | | | |
|---|---|---|---|---|---|
| | CBR | rt-VBR | nrt-VBR | UBR | ABR |
| TRAFFIC PARAMETERS: | | | | | |
| PCR AND CDVT | SPECIFIED | SPECIFIED | SPECIFIED | OPTIONAL | SPECIFIED |
| SCR, MBS, CDVT | N/A | SPECIFIED | SPECIFIED | N/A | N/A |
| MCR | N/A | N/A | N/A | N/A | SPECIFIED |
| QoS PARAMETERS: | | | | | |
| PEAK-TO-PEAK CDV | SPECIFIED | SPECIFIED | UNSPECIFIED | UNSPECIFIED | UNSPECIFIED |
| maxCTD | SPECIFIED | SPECIFIED | UNSPECIFIED | UNSPECIFIED | UNSPECIFIED |
| CLR | SPECIFIED | SPECIFIED | SPECIFIED | UNSPECIFIED | OPTIONAL |
| OTHERS: | | | | | |
| FEEDBACK | UNSPECIFIED | UNSPECIFIED | UNSPECIFIED | UNSPECIFIED | SPECIFIED |

CALL ADMISSION CONTROL SYSTEM FOR WIRELESS ATM NETWORKS

BACKGROUND OF THE INVENTION

1. Field of the Invention

The present invention is directed to a system which determines whether to accept requests for wireless connection received from a networked device. The invention has particular utility in wireless ATM networks, in which it may be used by a base station to determine whether to accept or to deny requests for wireless connection received from one or more such devices.

2. Description of the Related Art

ATM ("asynchronous transfer mode") is a protocol which was developed to address problems associated with transmitting multimedia data between networked devices. In particular, ATM networks are systems that negotiate and establish transmission parameters (e.g., bandwidth) prior to connecting two networked devices, "packetize" different types of data (e.g., video and audio data) into cells based on the established transmission parameters, and then multiplex these cells so that they can be transmitted over a single communication line to a receiving device. The receiving device then checks the transmitted data for errors and, if any are present, requests retransmission of the data by the transmitting device.

Traditionally, ATM networks were wire-based, meaning that devices therein were interconnected using fiber optic cables or the like. Recently, however, wireless ATM networks have been developed which replace at least some of these fiber optic cables with point-to-point wireless connections, such as radio-frequency ("RF") and infrared ("IR") links. A wireless ATM network of this type is described in U.S. patent application Ser. No. 08/770,024, entitled "Medium Access Control (MAC) Protocol For Wireless ATM" (Assignee: Philips Electronics North America Corp.), the contents of which are hereby incorporated by reference into the subject application as if set forth herein in full.

In detail, the foregoing U.S. patent application describes a communications protocol (i.e., the MAC protocol) for a wireless ATM network, which increases quality of service, particularly in terms of allocated bandwidth, by first reserving and then scheduling resources required for data transmission. In that protocol, connection to a particular network device (e.g., a wireless terminal) is either accepted or denied based on whether that device has sufficient available buffer space to support the connection and based on whether there are sufficiently-available slots in a control data frame. While the MAC protocol has proven to be highly effective, there is room for improvement, particularly with respect to determining whether a connection should be accepted or denied.

Accordingly, there exists a need for a call admission control system which may be used with communications protocols, such as the MAC protocol, and which provides a relatively simple method of making connection determinations.

SUMMARY OF THE INVENTION

The present invention addresses the foregoing needs by providing a call admission control protocol, for use in a network base station or the like, which determines whether the base station should accept connection to a network device based on an amount of buffer space required to accommodate the connection and on a nominal cell rate at which cells are output from the buffer for the requested connection. By determining whether to accept connection based on these factors, the present invention increases the efficiency and the speed of communications protocols with which it is used.

According to one aspect, the present invention is a system (e.g., a method or computer-executable process steps) which operates in an ATM layer of a base station and which determines whether the base station should accept or deny a wireless connection to a network device. In operation, the base station receives a request to initiate the wireless connection to the network device, and the base station determines, in response to the request, a nominal cell rate at which cells are exiting from a buffer in the network device for the requested wireless connection. Thereafter, the base station determines an amount of buffer space in the network device required to accommodate the connection, and decides whether it should accept or deny the wireless connection based on the nominal cell rate and the amount of buffer space required to accommodate the connection.

In preferred embodiments of the invention, the request to initiate the wireless connection is made to the base station by a network device using a traffic descriptor for a real-time variable bit rate ("rt-VBR") connection. However, it is noted that the invention is not limited to use with rt-VBR traffic, and that the invention can be used with any one or more types of ATM traffic.

In other preferred embodiments of the invention, when the base station denies the wireless connection, it determines an amount of buffer space which is available in the buffer, and then varies the nominal cell rate based on the amount of available buffer space so as to accommodate the request. By virtue of this feature of the invention, it is possible to increase the range of requests that the base station can accommodate.

According to another aspect, the present invention is a call admission control system for use in an asynchronous transfer mode network having at least one base station which is connectable to at least one network device over a wireless link. The system receives a request from a network device and then determines whether the request is to initiate a connection between the base station and the network device or to release a connection between the base station and the network device. In a case that the request is to initiate a connection between the base station and the network device, the system (i) determines, in response to the request to initiate the wireless connection, a nominal cell rate at which cells are exiting from a buffer in the network device for the requested wireless connection, (ii) determines an amount of buffer space in the network device required to accommodate the connection, and (iii) decides whether to accept the connection based on the nominal cell rate and the amount of buffer space required to accommodate the connection. In a case that the request is to release a connection between the base station and the network device, the system releases one or more existing connections therebetween.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENT

Figure 1:
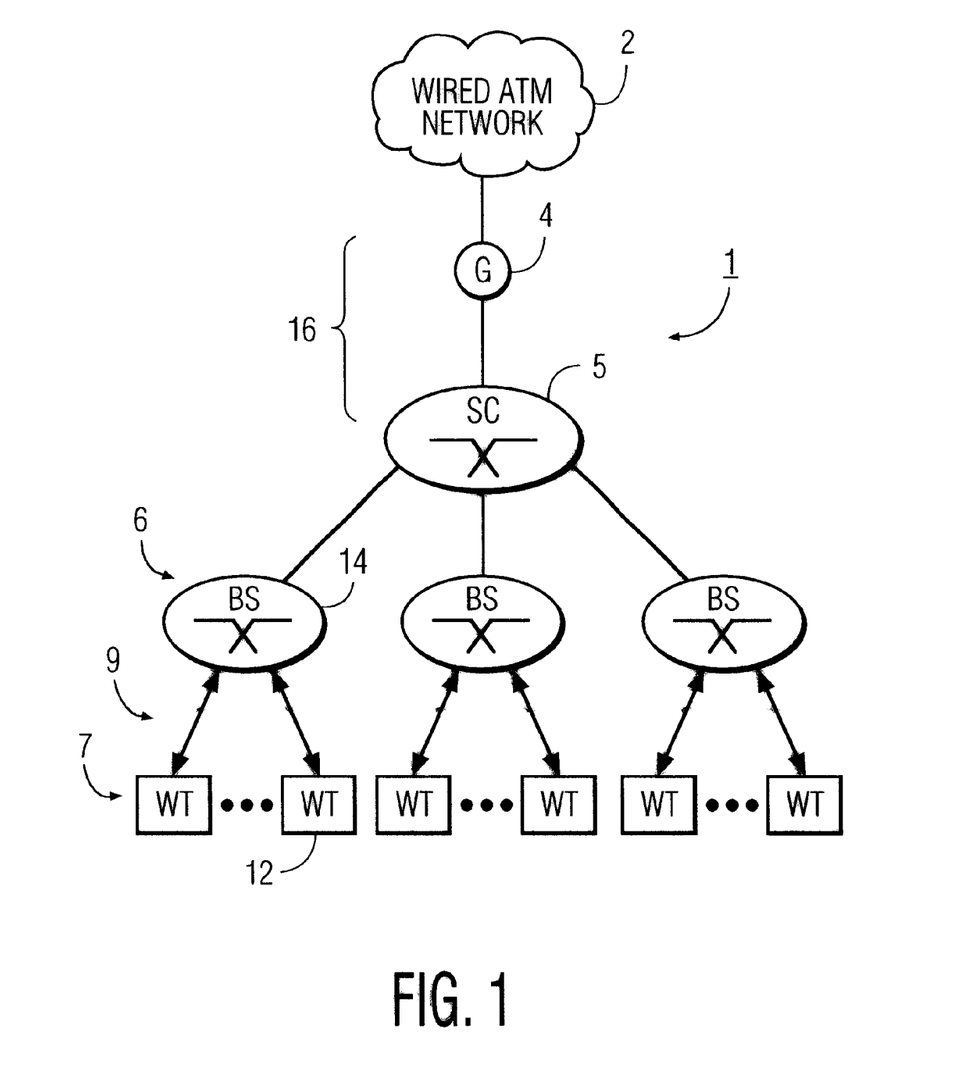
FIG. 1 shows a network on which the present invention may be implemented, which has a base station architecture and a tree topology.

The invention described herein is directed to a call admission control protocol for establishing wireless communications links between networked devices. FIG. 1 shows the topology of a wireless ATM network on which the invention may be implemented.

The wireless ATM network shown in FIG. 1 has a centralized, or base station, architecture and a tree topology. As shown, wireless ATM network 1 includes, among other things, wired ATM network 2, gateway ("G") 4, switching center ("SC") 5, base stations ("BS") 6, and network devices ("WT") 7. Base stations 6, switching center 5, and gateway 4 are typically connected to wired ATM network 2 via fiber optic cables or the like; although wireless connections or electrical cables may be used as well. Network devices 7, on the other hand, are connected to base stations 6 via wireless media 9, such as an RF link or an IR link. These network devices or "WTs" (short for "Wireless Terminal") can comprise any type of information transmitting and receiving device including, but not limited to, personal computers, digital telephones, video cameras, digital cameras, and digital televisions/settop boxes.

Wired ATM network 2 comprises a conventional ATM network of the type described above, which provides for resource sharing and data cell transfer among its various nodes. Gateway 4 is a port which transmits data cells comprised, e.g., of audio and video data, between wired ATM network 2 and switching center 5. Switching center 5 directs data cells received from gateway 4 to appropriate one(s) of base stations 6 based on network addresses in the cell headers, and passes data cells received from base stations 6 through to gateway 4. Base stations 6, which preferably comprise transmitters or the like within a predetermined proximity of their respective network devices, transmit and receive data from network devices with which they have an established connection.

In this regard, as is well known, in wireless ATM networks such as that shown in FIG. 1, there may be a number of connections between a single base station and a single network device; that is, one connection for each application programming running on the network device. As will become clear below, whether a base station accepts a wireless connection to a network device is determined, at least in part, based on how many connections already exist between the base station and the network device. Generally speaking, however, to establish a connection with a network device, the ATM layer (described below) of a base station performs a call admission control protocol to determine whether conditions exist which support the connection. This aspect of the invention is described in detail below with respect to FIG. 2. At this point, suffice it to say that, if it is determined that connection is permissible, the base station will send the network device a cell indicating that a connection has been established. Thereafter, the base station receives physical signals from the device via the wireless medium and converts these physical signals into ATM data cells, which are then relayed back to ATM network 2. Of course, this process is reversed in cases where the base station is transmitting data from the ATM network to the network devices.

Figure 3:
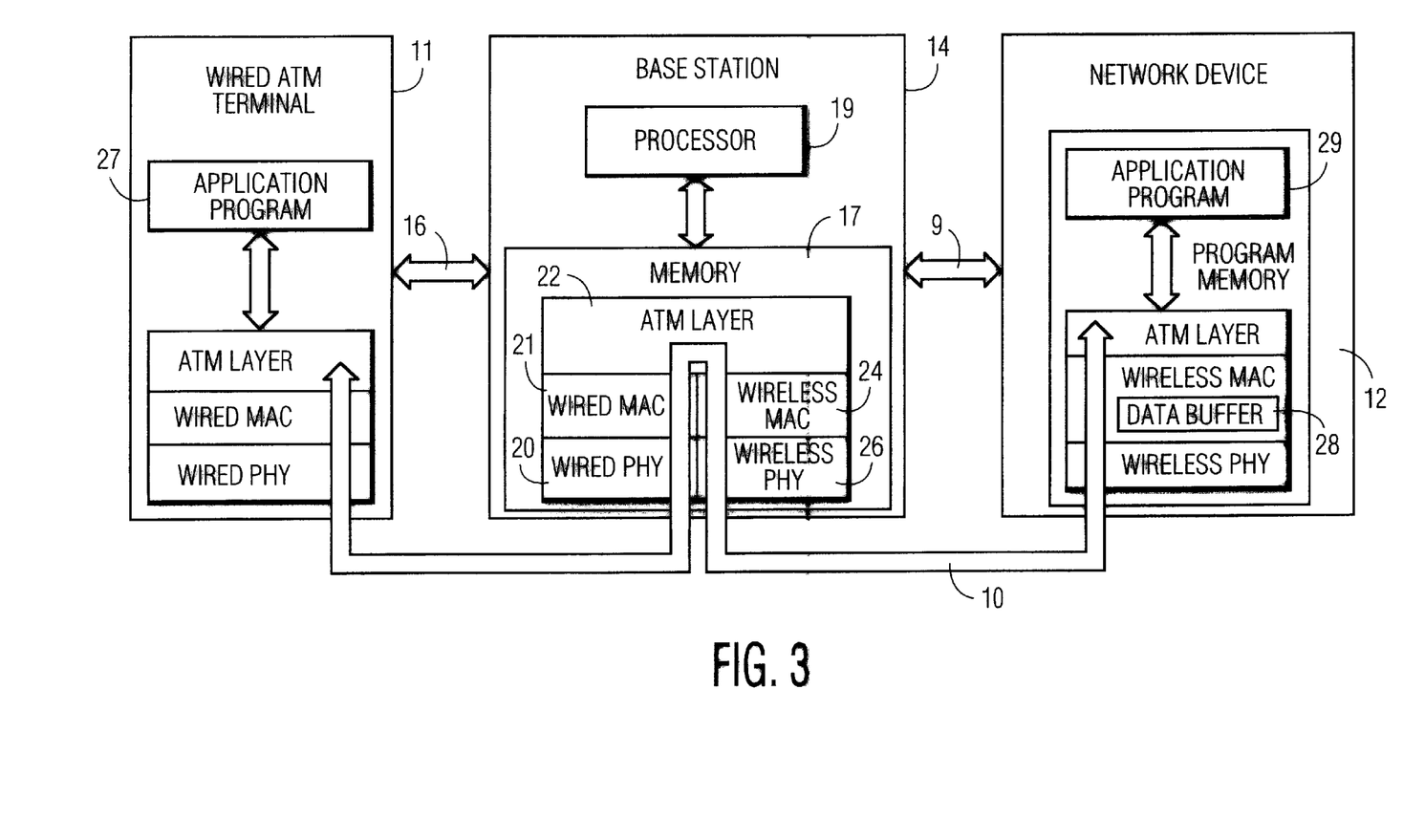
FIG. 3 is a close-up view showing network devices and protocol layers used to effect communications via wired and wireless media in accordance with the present invention.

FIG. 3 shows a layered protocol model (namely, the MAC protocol set forth in U.S. patent application Ser. No. 08/770,024, entitled "Medium Access Control (MAC) Protocol For Wireless ATM") which uses base stations to interface wired and wireless portions of ATM network 1. At one end of communication path 10 shown in FIG. 3 is a wired device/terminal 11, which can be a cable television transmitter or the like. At the other end of this communication path is a network device 12, which can be a digital television or the like. Base station 14 interconnects these devices via wired media 16 and wireless medium 9 in the manner shown above in FIG. 1.

Protocol stacks stored in memory 17 (e.g., an EPROM) on base station 14 are executed by processor 19, also on base station 14, to control conversion of data cells into physical signals and vice versa. Wire-specific attributes of communication path 10 are contained in wired PHY (i.e., "physical") layer 20 and wired MAC layer 21. These protocol layers transform physical signals on the wired media into ATM conforming data cells at ATM layer 22 which are independent of the physical medium employed. Wireless-specific attributes of communication path 10 are contained in wireless MAC layer 24 and wireless PHY layer 26. These layers convert ATM conforming cells at ATM layer 22 into physical signals which can be transmitted over the wireless medium. Corresponding MAC and PHY layers are provided in the wired ATM terminal and the network device to interface, respectively to application programs 27 and 29 stored, e.g., in program memories thereof.

Turning now to the call admission control protocol noted above, computer-executable process steps to effect this protocol are stored in a memory (e.g., memory 17) of one (or more) of the base stations on wireless network 1, preferably within the ATM layer. In brief, these steps include, among other things, code to receive a request from a network device, and code to determine whether the request is to initiate (i.e., setup) a connection between a base station and the network device or to release a connection between the base station and the network device. The process steps also include code to release a connection between the base station and the network device in a case that the determining code determines that a connection is to be released, and code to initiate a connection between the base station and the network device in a case that the determining code determines that a connection is to be initiated. In the invention, the code to initiate a connection comprises (i) code to determine, in response to the request to initiate the wireless connection, a nominal cell rate at which cells are exiting from a buffer in the network device for the requested wireless connection, (ii) code to determine an amount of buffer space in the network device required to accommodate the connection, and (iii) code to decide whether to accept the connection based on the nominal cell rate and the amount of buffer space required to accommodate the connection.

Figure 2:
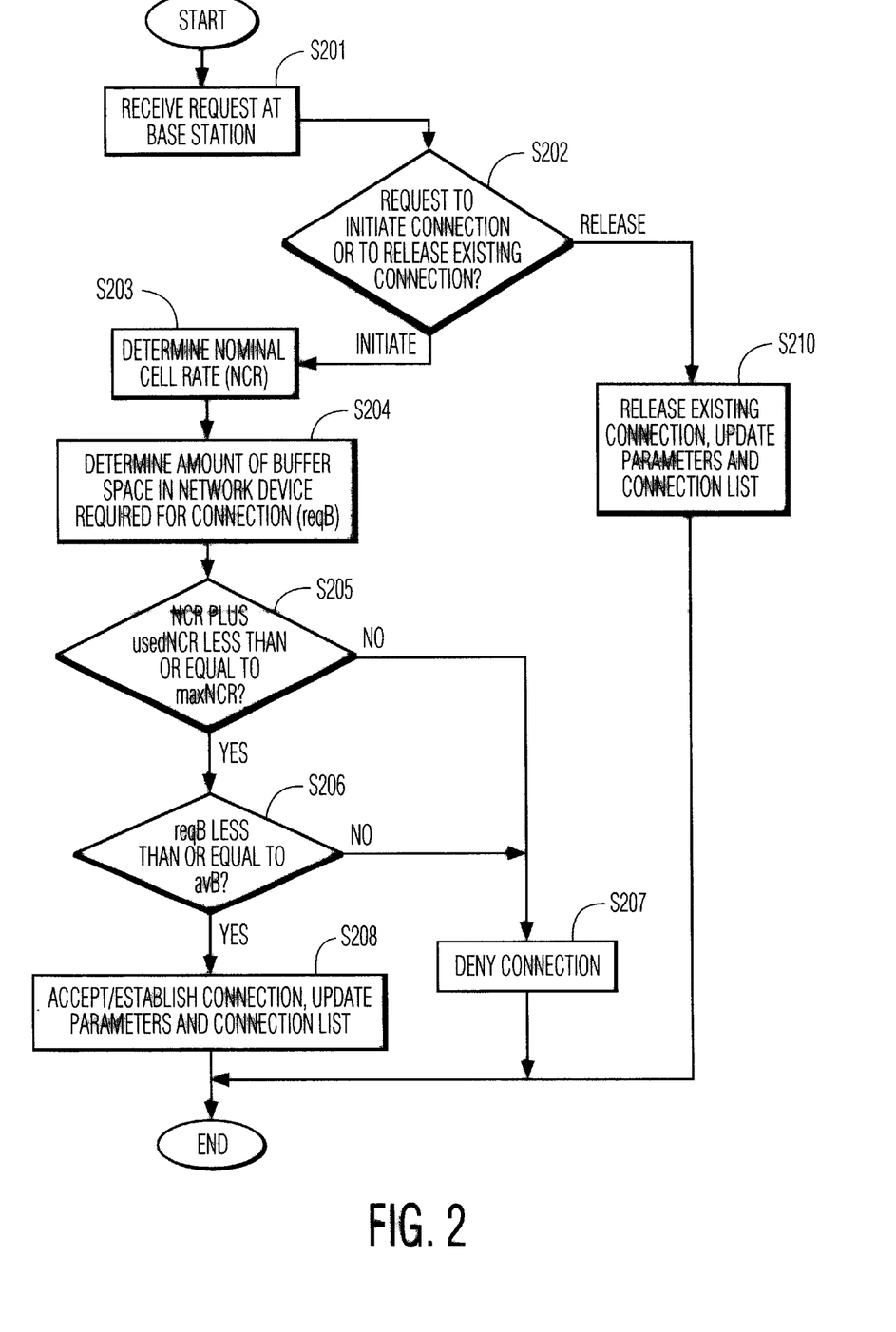
FIG. 2 is a flow diagram depicting process steps to implement the call admission control protocol of the present invention.

FIG. 2 is a flow diagram showing the call admissions control protocol which was described briefly above. The Appendix attached hereto shows pseudo-code for implementing the process steps of FIG. 2. To begin, in step S201, a base station receives a request from a network device. This request is preferably formatted according to one of the five known ATM traffic types, namely, constant bit rate ("CBR") traffic, real-time variable bit rate ("rt-VBR") traffic, non-real-time variable bit rate ("nrt-VBR") traffic, unspecified bit rate ("UBR") traffic, and available bit rate ("ABR") traffic. In this regard, although the invention will be described herein with respect to rt- VBR traffic, the invention can accommodate the other four known ATM traffic types, as well as other traffic types that provide traffic parameters and quality of service ("QoS") parameters similar to those described below.

Figure 4:
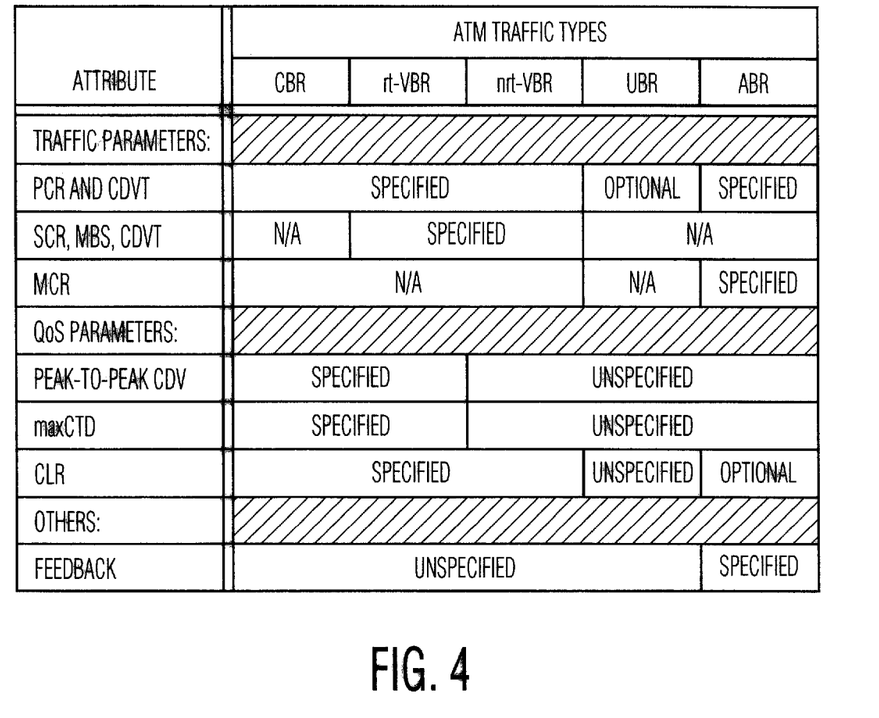
FIG. 4 is a table which depicts traffic and quality-of-service parameters associated with five known ATM traffic types.

In this regard, FIG. 4 is a table which sets forth traffic and QoS parameters for the various ATM traffic types. Specifically, FIG. 4 provides an indication, for the various ATM traffic types, as to which traffic parameters are optional, available or not available ("n/a"), and specified or unspecified. Thus, with reference to FIG. 4, a traffic descriptor "D" for rt-VBR traffic is defined as follows:

$$D=\{PCR, CDVT, SCR, MBS, \text{peak-to-peak } CDV, maxCTD, CLR\},$$

where PCR is the peak cell rate, CDVT is the cell delay variation tolerance, SCR is the sustainable cell rate, MBS is the maximum burst size, peak-to-peak CDV is the peak-to-peak cell delay variation, maxCTD is the maximum cell transfer delay, and CLR is the cell loss ratio. As shown in the figure, MCR (i.e., the minimum cell rate), for example, is not a part of the traffic descriptor for rt-VBR traffic.

Each of the foregoing parameters is well known to those skilled in the art; however, since PCR, MBS, SCR, maxCTD are used in preferred embodiments of the invention, brief descriptions thereof are provided herein for the sake of completeness. In this regard, PCR defines the peak cell rate permissible for a connection between a base station and a network device (in the context of the present invention, to a buffer in the network device). MBS defines the maximum length (in terms of cells) of a data burst. SCR defines a sustainable cell rate for data cells being transmitted between the base station and the network device. Finally, maxCTD is a constraint which defines a maximum delay between two consecutive data cells. As described in more detail below, the present invention uses these parameters to determine a nominal cell rate ("NCR") at which data for a particular connection is output from a buffer on a network device (e.g., to the base station) and a buffer space required to accommodate connection ("reqB").

Following step S201, processing proceeds to step S202. Step S202 determines whether the request received in step S201 comprises a request to initiate a connection between the network device and the base station or a request to release an existing connection therebetween. In a case that the request is a request to initiate connection, processing proceeds to step S203. Step S203 determines the NCR at which data for that connection is being output from a data buffer in the requesting network device (see, e.g., data buffer 28 in the MAC layer of FIG. 3). In the present invention, this step is performed by code which determines a first nominal cell rate value $NCR_1$ based on maxCTD; code which determines a second nominal cell rate value $NCR_2$ based on available buffer space ("avB") in the network device at substantially a same time that the request to initiate connection is received, code which determines a third nominal cell rate value $NCR_3$ based on the system's SCR, and code which selects as the NCR the largest of $NCR_1$, $NCR_2$ and $NCR_3$.

Figure 5:
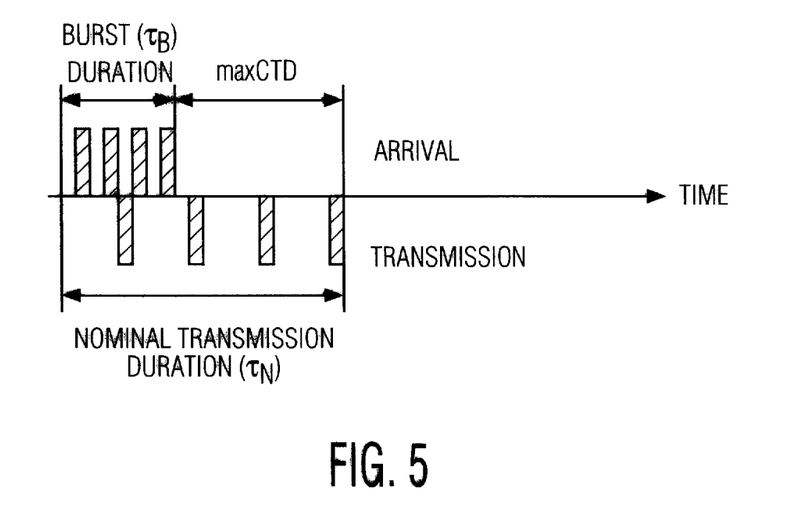
FIG. 5 depicts transmission of ATM data cells.

To determine $NCR_1$, the present invention first determines a burst duration, $\tau_B$, for the requested connection. The burst duration defines the time that it takes to transmit a data burst into data buffer 28 in the MAC layer of the network device. Specifically $\tau_B$ is determined as follows:

$$\tau_B = \frac{MBS}{PCR}, \quad (1)$$

where MBS and PCR are defined above. Thereafter a nominal transmission duration, $\tau_N$, is determined for a data burst containing multiple cells. As shown in FIG. 5, the nominal transmission duration $\tau_N$ is the actual time that is required to transmit the data burst between the base station and the network device, and corresponds to the sum of the burst duration ($\tau_B$) and the maximum cell transfer delay (maxCTD). In terms of $NCR_1$, $\tau_N$ is defined as follows:

$$\tau_N = \frac{MBS}{NCR_1}, \quad (2)$$

where MBS is defined above and $NCR_1$ is unknown.

Since maxCTD defines the maximum cell transfer delay to support a particular connection, it follows that, for any data cell $$\tau_N \leq \tau_B + maxCTD \quad .(3)$$

Using this relationship, as well as those in equations (1) and (2), it is possible to determine $NCR_1$. That is, substituting equations (1) and (2) into equation (3) and rearranging the variables yields the following equation:

$$NCR_1 \geq \left[\frac{MBS}{PCR \cdot maxCTD + MBS}\right] \cdot PCR. \quad (4)$$

The present invention solves the foregoing equation for $NCR_1$ using specified traffic parameters from traffic descriptor D.

To determine $NCR_2$, the present invention determines the amount of available buffer space ("avB") in the network device at substantially a same time that the device issues a request to initiate connection to the base station. In preferred embodiments of the invention, avB is determined based on a predetermined maximum buffer capacity and an amount of buffer space previously used for other connections. In this regard, in order to accommodate a data burst of length MBS without overflowing the buffer, the amount of available buffer space must satisfy the following relationship:

$$avB \geq (PCR - NCR_2) \cdot \left(\frac{MBS}{PCR}\right). \quad (5)$$

In short, equation (5) merely states that the amount of available buffer space, avB, must be greater than or equal to the difference between the cells entering the buffer and the cells leaving the buffer over the duration $\tau_B$.

Rearranging the terms of equation (5) yields the following expression:

$$NCR_2 \geq \left[1 - \frac{avB}{MBS}\right] \cdot PCR. \quad (6)$$

The present invention solves the foregoing equation for $NCR_2$ using specified traffic parameters and the available buffer space.

To determine a value for $NCR_3$, the present invention simply sets NCR3 to be greater than or equal to SCR. This substantially ensures operability of the wireless ATM connection. Thus, in this case, $$NCR_3 \geq SCR. \quad (7)$$

Once values for NCR, $NCR_2$ and $NCR_3$ are determined in equations (4), (6) and (7) above, step S203 determines a value for NCR as follows:

$$NCR \geq \max[NCR_1, NCR_2, NCR_3]. \quad (8)$$

Returning to FIG. 2, after a value for NCR has been determined in step S203, step S204 determines the buffer space, reqB, required to accommodate the requested connection. ReqB is determined based on equation (5), as follows $$reqB = \max\left[0, (PCR - NCR) \cdot \left(\frac{MBS}{PCR}\right)\right]. \quad (9)$$

That is, equation (5) defines a required buffer space in a case where PCR (i.e., the rate at which cells enter into the buffer) is greater than NCR (i.e., the rate at which cells exit the buffer). Normally, NCR is less than or equal to PCR. However, in a case that NCR is greater than PCR, meaning that cells are exiting the buffer at a greater rate than they are entering the buffer, there is no need to "reserve" buffer space for a particular connection. Accordingly, in this case, equation (9) determines that the buffer space required to accommodate the connection is zero. That is, since "PCR−NCR" will yield a negative value for the non-zero term in equation (9), and since equation (9) takes the maximum of zero and the non-zero term, in a case that NCR is greater than PCR (i.e., in a case that the non-zero term is less than zero), equation (9) outputs a zero.

Next, steps S205 and S206 decide whether to accept or to deny the requested wireless connection based on NCR and avB. In more detail, step S205 compares a current NCR for all connections between the base station and the network device to a total nominal cell rate that can be supported for all possible connections between the base station and the network device (called "maxNCR"). This maxNCR value is pre-stored in a memory on the base station. In making its determination, step S205 also takes into account the sum of all nominal cell rates for all existing connections between the base station and the network device (called "usedNCR"). This usedNCR value is maintained by the base station in its memory and is updated each time a connection to a network device is established. In detail, step S205 adds usedNCR to the value of NCR determined in equation (9) and then compares this sum to maxNCR. In a case that the sum of NCR and usedNCR is greater than maxNCR, processing proceeds to step S207, in which the requested connection is denied. To indicate that connection has been denied, a busy signal may be output from the base station to the requesting network device. Thereafter, processing may end until a new request for connection is received.

Returning to step S205, in a case that the sum of NCR and usedNCR is less than or equal to maxNCR, processing proceeds to step S206. Step S206 compares the required available buffer space for the requested connection, reqB, to the available buffer space, avB. In a case that reqB is greater than avB, processing proceeds to step S207, in which the request for connection is denied. On the other hand, in a case that reqB is less than or equal to avB, processing proceeds to step S208, in which the base station accepts the connection. The base station communicates acceptance of the connection to the network device by transmitting data cells which indicate that connection has been accepted. At this point, values of avB and usedNCR are updated and the newly-established connection is added to a list of connections maintained in memory by the base station. Thereafter, the call admission control procedure ends and communications between the base station and the network device commence.

Rather than proceeding directly to step S207 from steps S205 and S206, the invention may attempt to accommodate the request for connection by varying the NCR based on the amount of available buffer space. Specifically, when the buffer is relatively full and the total usedNCR is relatively low, for an "$i^{th}$" request, it is possible to increase the NCR (and hence decrease reqB—see equation (9) above) by a value which is equal to $$\operatorname{argmax}\left[-\frac{d}{dNCR(i)}(reqB(i))\right], \quad (10)$$

without violating the maxCTD constraint set forth above. As a result, buffer space is saved. This buffer space can be used to accommodate the request for connection. Conversely, when the total usedNCR is relatively high and the buffer is relatively empty, the invention may decrease the NCR (and hence increase reqB) for a current request. NCR saved in this manner also may be used to accommodate the request for connection.

The foregoing describes the case in which step S202 has determined that the request received in step S201 is a request to initiate connection. In a case that step S202 determines that the request is to release an existing connection between the base station and the network device, processing proceeds to step S210. Step S210 releases the connection and also updates values for avB and usedNCR based on the released connection, deletes the connection from the list of connections maintained by the base station, and reorders connections if necessary. Thereafter, processing ends until a new request for connection is received.

Figure 6:
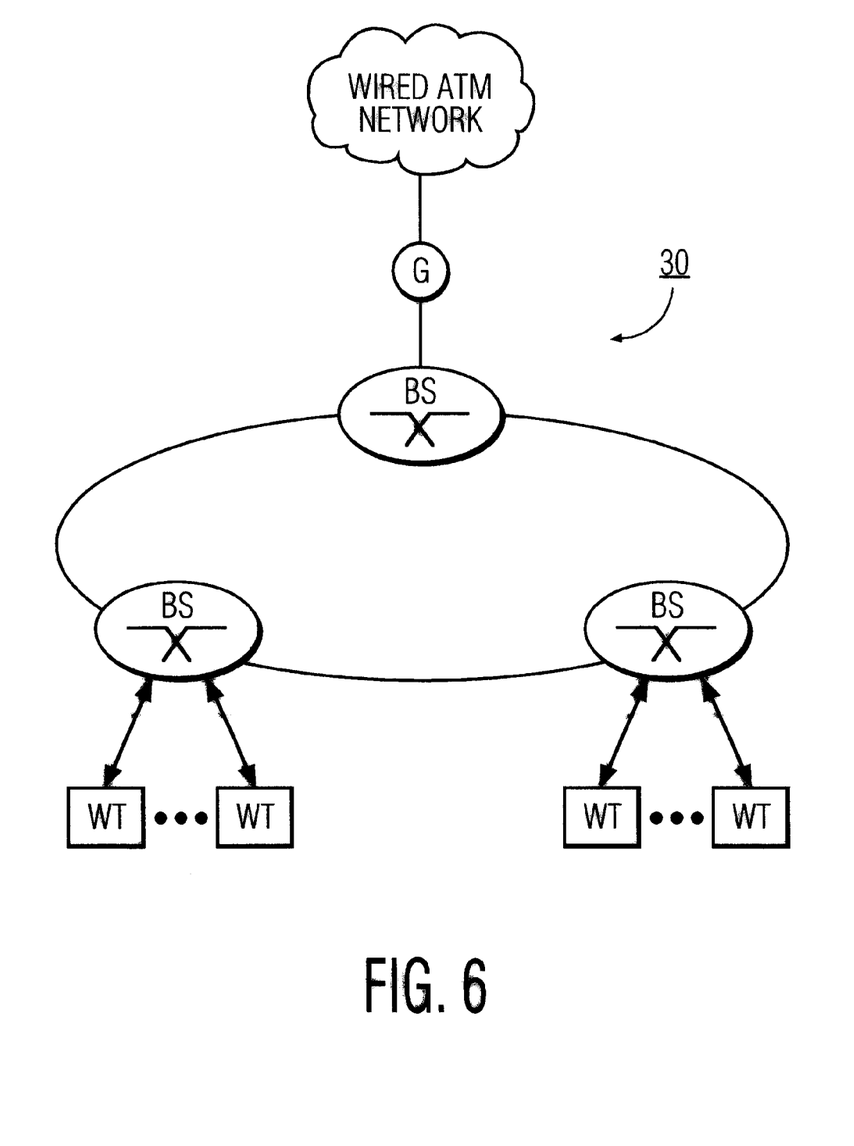
FIG. 6 shows a network on which the present invention may be implemented, which has a base station architecture and a ring topology.
Figure 7:
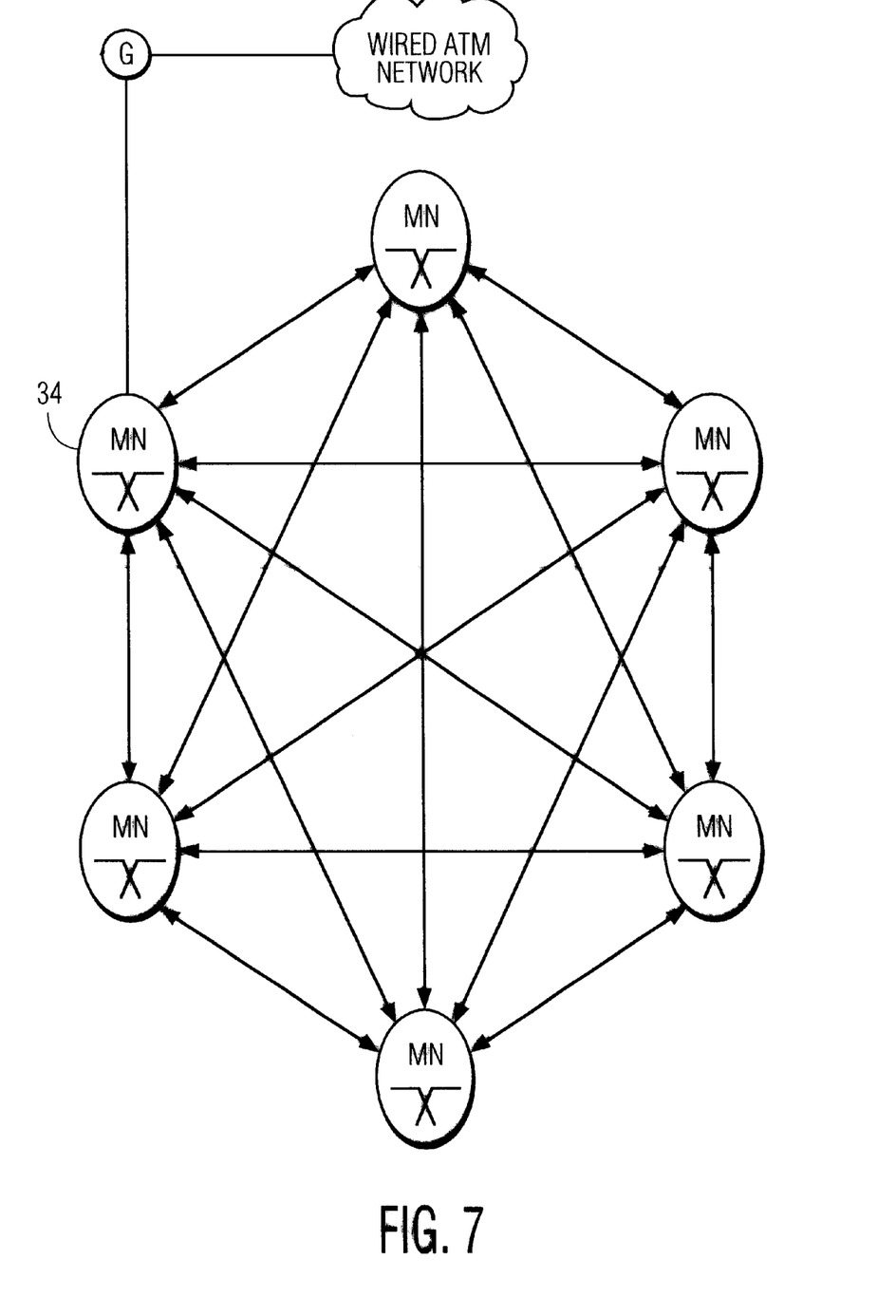
FIG. 7 shows a network on which the present invention may be implemented, which uses a mobile node (i.e., a central controller) that functions in substantially the same manner as a base station.
Figure 8:
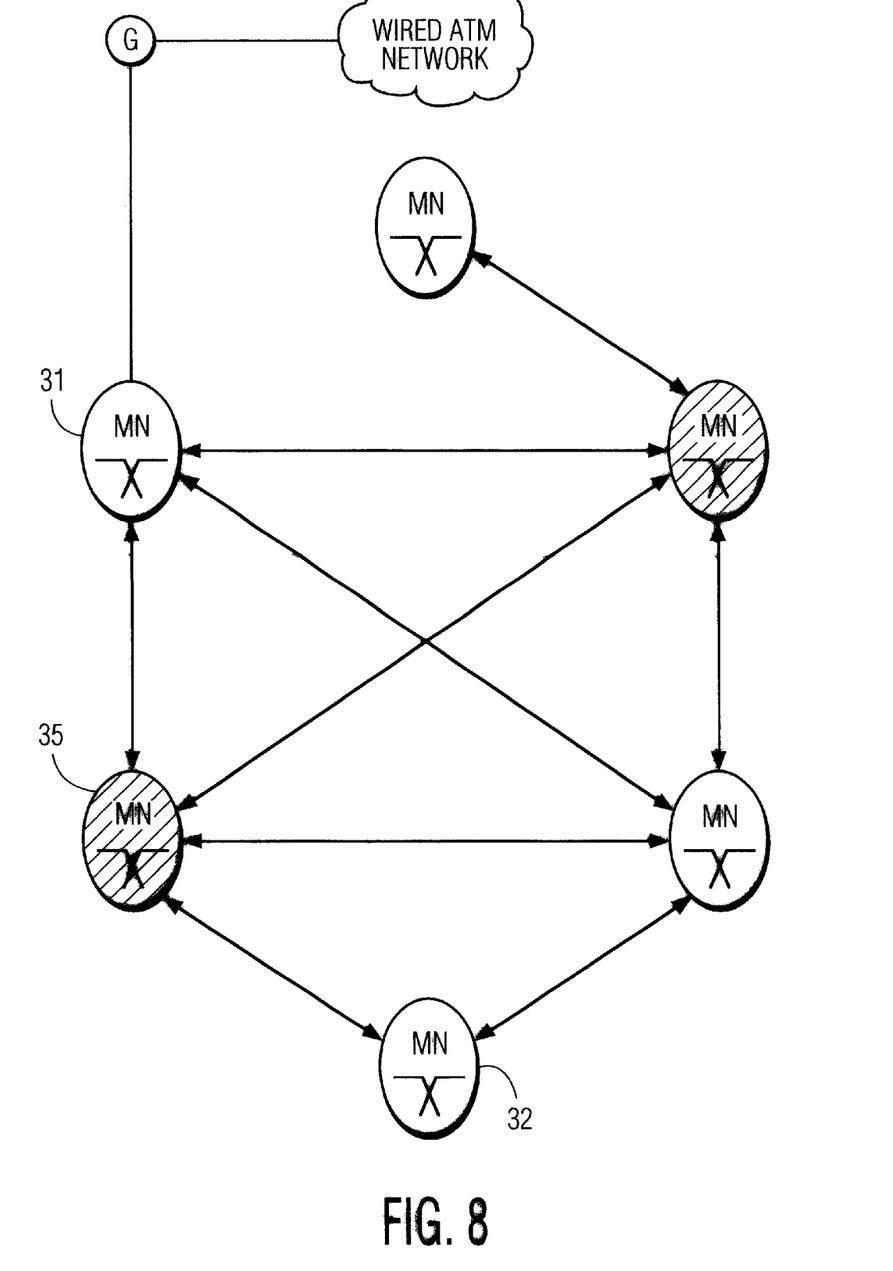
FIG. 8 shows an alternative network on which the present invention may be implemented, which also uses a mobile node that functions in substantially the same manner as a base station, together with one or more forwarding nodes for forwarding cells among the mobile nodes.

Although the invention has been described above with respect to MAC protocol, the invention can be used with other existing wireless ATM protocols as well. In addition, the invention is not limited to use with the network architecture shown in FIG. 1, but rather can be used with a variety of network architectures. FIGS. 6, 7 and 8 show examples of these other types of network architectures.

More specifically, FIG. 6 shows wireless ATM network 30 with a base station architecture and a ring (as opposed to a tree) topology. As shown, wireless network 30 includes, among other things, a wired ATM network, a gateway, base stations, and network devices. These features are similar to those shown in FIG. 1, except with regard to the connections between the base stations and the operation thereof. More specifically, in the architecture shown in FIG. 6, rather than using a centralized switching center, cells are passed between base stations until the cells reach their intended destinations. As was the case above, in the network shown in FIG. 6, code to implement the call admission control protocol of the present invention is resident on each base station. Operation thereof is identical to that described above.

FIG. 7 shows a network architecture which uses hybrid stations known as mobile nodes ("MN"). These hybrid stations comprise network devices, one of which, called a central controller, is capable of functioning as a base station. Thus, the term "base station" as used herein encompasses a central controller of this type, as well as similarly-functioning network nodes. In the architecture shown in FIG. 7, the central controller (i.e., MN 34) is capable of communicating with all other mobile nodes. On the other hand, in a similar architecture shown in FIG. 8, node 31 is unable to communicate directly with node 32. Accordingly, in this case, cells are passed from the central controller to their intended recipient(s) via forwarding nodes (e.g., MN 35). In both cases (i.e., in the networks shown in FIGS. 7 and 8), code to implement the call admission control protocol of the present invention is resident the central controller (and, potentially, other mobile nodes as well). Operation thereof is identical to that described above.

The present invention has been described with respect to a particular illustrative embodiment. It is to be understood that the invention is not limited to the above-described embodiment and modifications thereto, and that various changes and modifications may be made by those of ordinary skill in the art without departing from the spirit and scope of the appended claims.

APPENDIX

```
** PSEUDO-CODE FOR CALL ADMISSION CONTROL PROTOCOL
**
**  maxB:       maximum buffer size of network device WT
**  avB:        available buffer space before an i^th request is accepted
**  reqB(i):    required buffer space for the i^th request
**  maxNCR:     maximum aggregate cell rate that the system can
              support
**  usedNCR:    sum of all nominal cell rates supported by the system
              before the i^th request
**  NCR(i):     nominal cell rate for the i^th request
**  PCR(i):     peak cell rate for the i^th request
**  MBS(i):     maximum burst length/size for the i^th request
**  maxCTD(i):  maximum cell transfer delay of the i^th request
(0) Initialization: i = 1; avB = maxB; usedNCR = 0
(1) Wait for a (connection/release) request
(2) If a received request is a request to release existing connection k, then
        set avB = avB + reqB(k)
        set usedNCR = usedNCR – NCR(k)
        delete connection k from list of connections and reorder
        connections
        set i = i + 1
    goto (1)
(3) If the received request is a connection/setup request having traffic
    descriptor D, then
        determine NCR(i) and reqB(i) from D
        If { (reqB(i) ≤ avB) and (NCR(i) + usedNCR ≤ maxNCR)}
            accept the i^th request
            set avB = avB – reqB(i)
            set usedNCR = usedNCR + NCR(i)
            add connection i to list of connections
            set i = i + 1
        else reject the i^th request
    goto (1)
```

What is claimed is:

1. A method of determining whether to accept a wireless connection to a network device, the method comprising:

a receiving step which receives a request to initiate the wireless connection to the network device;

a first determining step which determines, in response to the request to initiate the wireless connection, a nominal cell rate at which cells are exiting from a buffer in the network device for the requested wireless connection;

a second determining step which determines an amount of buffer space in the network device required to accommodate the connection; and a deciding step which decides whether to accept the wireless connection based on the nominal cell rate and the amount of buffer space required to accommodate the connection, wherein the first determining step comprises:

determining a first nominal cell rate value;

determining a second nominal cell rate value;

determining a third nominal cell rate value; and selecting, as the nominal cell rate, a largest of the first nominal cell rate value, the second nominal cell rate value, and the third nominal cell rate value.

2. A method according to claim 1, wherein the first nominal cell rate value is determined based on a maximum cell transfer delay which defines a maximum value of a delay between departure and arrival of a cell at the network device;

wherein the second nominal cell rate value is determined based on an amount of available buffer space at substantially a time that the request to initiate the wireless connection is received; and wherein the third nominal cell rate value is determined based on a sustainable cell rate at which cells are transmitted between a base station and the network device.

3. A method according to claim 2, wherein the first nominal cell rate value, $NCR_1$, is determined as follows:

$$NCR_1 \geq \left[\frac{MBS}{PCR \cdot \text{maxCTD} + MBS}\right] \cdot PCR,$$

where maxCTD comprises the maximum cell transfer delay, PCR comprises a peak cell rate at which cells are introduced into the buffer, and MBS comprises a maximum burst size;

wherein the second nominal cell rate value, $NCR_2$, is determined as follows:

$$NCR_2 \geq \left[1 - \frac{avB}{MBS}\right] \cdot PCR,$$

where avB comprises the amount of available buffer space at substantially a time that the request to initiate the wireless connection is received; and wherein the third nominal cell rate value, $NCR_3$, is determined as follows:

$$NCR_3 \geq SCR,$$

where SCR comprises a sustainable cell rate for data transmission between the base station and the network device.

4. A method according to claim 1, wherein the second determining step comprises determining the amount of buffer space required to accommodate the connection based on the nominal cell rate.

5. A method according to claim 4, wherein the amount of buffer space, reqB, required to accommodate the connection is determined as follows:

$$reqB = \max\left[0, (PCR - NCR) \cdot \left(\frac{MBS}{PCR}\right)\right],$$

where NCR comprises the nominal cell rate, PCR comprises a peak cell rate at which cells are introduced into the buffer, and MBS comprises a maximum burst size.

6. A method according to claim 1, wherein, in a case that the deciding step decides not to accept the wireless connection, the method further comprises:

a third determining step which determines an amount of buffer space which is available in the buffer; and varying the nominal cell rate based on the amount of available buffer space so as to accommodate the request.

7. An apparatus for determining whether to accept a wireless connection to a network device, the apparatus comprising:

a memory which stores computer-executable process steps; and a processor which executes the process steps stored in the memory so as (i) to receive a request to initiate the wireless connection to the network device, (ii) to determine, in response to the request to initiate the wireless connection, a nominal cell rate at which cells are exiting from a buffer in the network device for the requested wireless connection, (iii) to determine an amount of buffer space in the network device required to accommodate the connection, and (iv) to decide whether to accept the wireless connection based on the nominal cell rate and the amount of buffer space required to accommodate the connection, wherein the processor determines the nominal cell rate by executing process steps (i) to determine a first nominal cell rate value, (ii) to determine a second nominal cell rate value, (iii) to determine a third nominal cell rate value, and (iv) to select, as the nominal cell rate, a largest of the first nominal cell rate value, the second nominal cell rate value, and the third nominal cell rate value.

8. An apparatus according to claim 7, wherein the processor determines the first nominal cell rate value based on a maximum cell transfer delay which defines a maximum value of a delay between departure and arrival of a cell at the network device;

wherein the processor determines the second nominal cell rate value based on an amount of available buffer space at substantially a time that the request to initiate the wireless connection is received; and wherein the processor determines the third nominal cell rate value based on a sustainable cell rate at which cells are transmitted between the apparatus and the network device.

9. An apparatus according to claim 8, wherein the first nominal cell rate value, $NCR_1$, is determined by the processor based on the following equation:

$$NCR_1 \geq \left[\frac{MBS}{PCR \cdot \text{maxCTD} + MBS}\right] \cdot PCR,$$

where maxCTD comprises the maximum cell transfer delay, PCR comprises a peak cell rate at which cells are introduced into the buffer, and MBS comprises a maximum burst size;

wherein the second nominal cell rate value, $NCR_2$, is determined by the processor based on the following equation:

$$NCR_2 \geq \left[1 - \frac{avB}{MBS}\right] \cdot PCR,$$

where avB comprises the amount of available buffer space at substantially a time that the request to initiate the wireless connection is received; and wherein the third nominal cell rate value, $NCR_3$, is determined by the processor as follows:

$$NCR_3 \geq SCR,$$

where SCR comprises a sustainable cell rate for data transmission between the apparatus and the network device.

10. An apparatus according to claim 7, wherein the processor determines the amount of buffer space required to accommodate the connection based on the nominal cell rate.

11. An apparatus according to claim 10, wherein the amount of buffer space, reqB, required to accommodate the connection is determined by the processor based on the following equation:

$$reqB = \max\left[0, (PCR - NCR) \cdot \left(\frac{MBS}{PCR}\right)\right],$$

where NCR comprises the nominal cell rate, PCR comprises a peak cell rate at which cells are introduced into the buffer, and MBS comprises a maximum burst size.

12. An apparatus according to claim 7, wherein the request to initiate the wireless connection comprises a traffic descriptor for a real-time variable bit rate (rt-VBR) connection.

13. An apparatus according to claim 7, wherein, in a case that the processor decides not to accept the wireless connection, the processor executes process steps (i) to determine an amount of buffer space which is available in the buffer, and (ii) to vary the nominal cell rate based on the amount of available buffer space so as to accommodate the request.

14. Computer-executable process steps stored on a computer-readable medium, the computer-executable process steps to determine whether to accept a wireless connection to a network device, the computer-executable process steps comprising:

code to receive a request to initiate the wireless connection to the network device;

first determining code to determine, in response to the request to initiate the wireless connection, a nominal cell rate at which cells are exiting from a buffer in the network device for the requested wireless connection;

second determining code to determine an amount of buffer space in the network device required to accommodate the connection; and deciding code to decide whether to accept the wireless connection based on the nominal cell rate and the amount of buffer space required to accommodate the connection, wherein the first determining code comprises:

code to determine a first nominal cell rate value;

code to determine a second nominal cell rate value;

code to determined a third nominal cell rate value; and code to select, as the nominal cell rate, a largest of the first nominal cell rate value, the second nominal cell rate value, and the third nominal cell rate value.

15. Computer-executable process steps according to claim 14, wherein the first nominal cell rate value is determined based on a maximum cell transfer delay which defines a maximum value of a delay between departure and arrival of a cell at the network device;

wherein the second nominal cell rate value is determined based on an amount of available buffer space at substantially a time that the request to initiate the wireless connection is received; and wherein the third nominal cell rate value is determined based on a sustainable cell rate at which cells are transmitted between a base station and the network device.

16. Computer-executable process steps according to claim 15, wherein the code to determine the first nominal cell rate value determines the first nominal cell rate value, $NCR_1$, in accordance with the following equation:

$$NCR_1 \geq \left[ \frac{MBS}{PCR \cdot \text{maxCTD} + MBS} \right] \cdot PCR,$$

where maxCTD comprises the maximum cell transfer delay, PCR comprises a peak cell rate at which cells are introduced into the buffer, and MBS comprises a maximum burst size;

wherein the code to determine the second nominal cell rate value determines the second nominal cell rate value, $NCR_2$, in accordance with the following equation:

$$NCR_2 \geq \left[ 1 - \frac{avB}{MBS} \right] \cdot PCR,$$

where avB comprises the amount of available buffer space at substantially a time that the request to initiate the wireless connection is received; and wherein the code to determine the third nominal cell rate value determines the third nominal cell rate value, $NCR_3$, as follows:

$$NCR_3 \geq SCR,$$

where SCR comprises a sustainable cell rate for data transmission between the base station and the network device.

17. Computer-executable process steps according to claim 14, wherein the second determining code comprises code to determine the amount of buffer space required to accommodate the connection based on the nominal cell rate.

18. Computer-executable process steps according to claim 17, wherein the second determining code determines the amount of buffer space, reqB, required to accommodate the connection in accordance with the following equation:

$$reqB = \max\left[ 0, (PCR - NCR) \cdot \left( \frac{MBS}{PCR} \right) \right],$$

where NCR comprises the nominal cell rate, PCR comprises a peak cell rate at which cells are introduced into the buffer, and MBS comprises a maximum burst size.

19. Computer-executable process steps according to claim 14, wherein the computer-executable process steps further comprise:

third determining code to determine an amount of buffer space which is available in the buffer in a case that the deciding code decides not to accept the wireless connection; and code to vary the nominal cell rate based on the amount of available buffer space so as to accommodate the request.

* * * * *